May 26, 1970

F. H. TENNIS 3,513,877

CONTROL VALVE WITH COUNTERBALANCING AND DIRECTION
CONTROLLING VALVE ELEMENT

Filed March 27, 1968

Inventor
Francis H. Tennis
By Ira Milton Jones
Attorney

Inventor
Francis H. Tennis

United States Patent Office 3,513,877
Patented May 26, 1970

3,513,877
CONTROL VALVE WITH COUNTER-
BALANCING AND DIRECTION CON-
TROLLING VALVE ELEMENT
Francis H. Tennis, Oconomowoc, Wis., assignor, by mesne
assignments, to Koehring Company, Milwaukee, Wis.,
a corporation of Wisconsin
Filed Mar. 27, 1968, Ser. No. 716,410
Int. Cl. F16k *31/12, 31/14, 31/36*
U.S. Cl. 137—596.13                                    13 Claims

ABSTRACT OF THE DISCLOSURE

The inlets of a main valve and a pilot valve therefor are supplied with pressure fluid from the same pump. The main valve element is movable under return bias from a normal operating position toward a metering position throttling return flow from the governed cylinder in consequence of load induced drop in pressure in the expanding end of the cylinder. A dash pot limits the rate at which the main valve element can be moved toward metering position.

---

Figure 1:
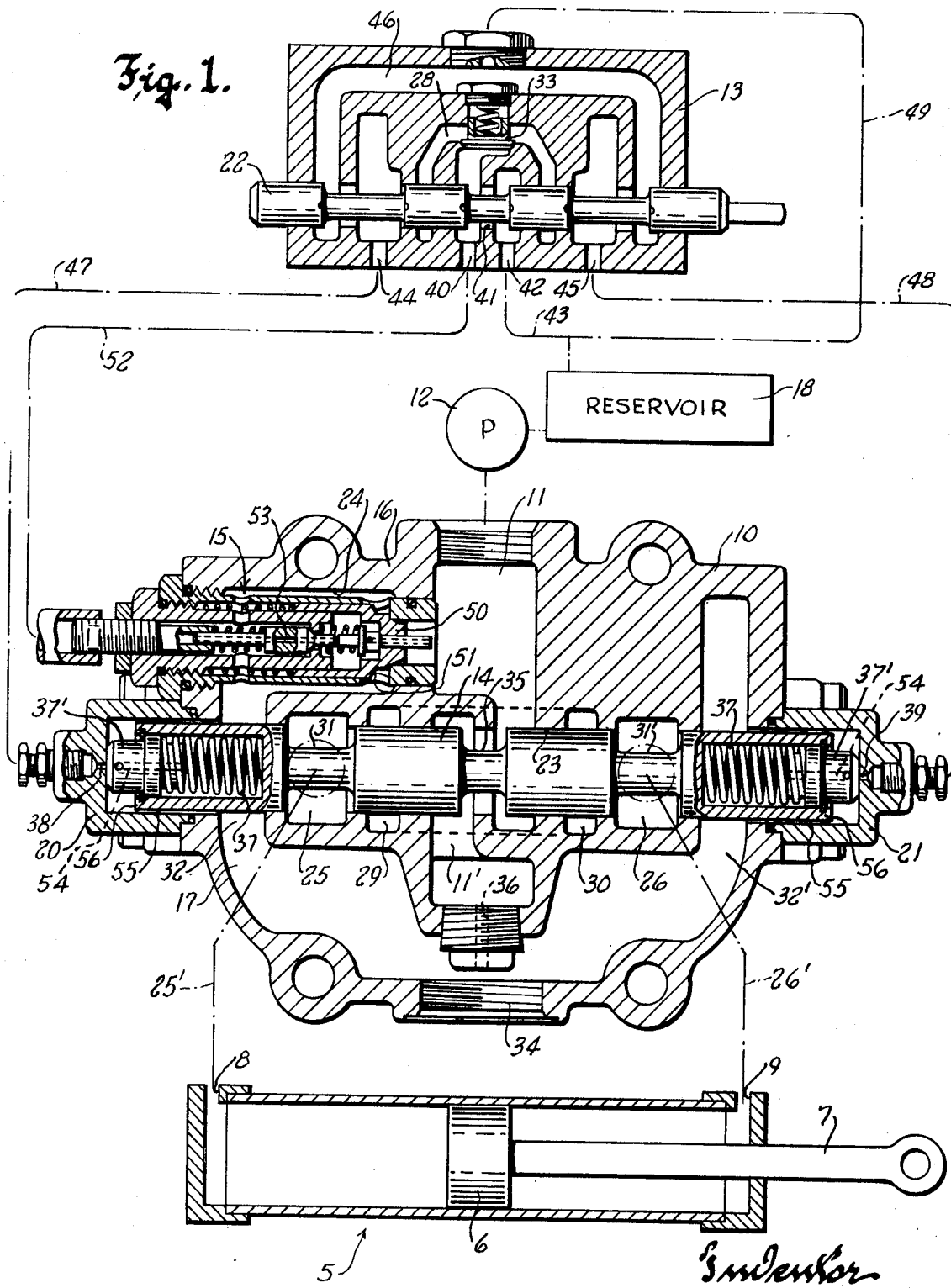

This invention relates to fluid pressure operated systems of the type comprising a reversible fluid motor such as a double acting hydraulic cylinder; and it has more particular reference to improvements in control devices for such motors.

In general, this invention has two main objectives, namely, to achieve the known advantages of pilot governed fluid pressure actuation of a main valve for a reversible fluid motor; and to also prevent the motor from being driven by its load and thereby assure positive control over the motor.

Complicated and usually costly flow correlating and pressure counterbalancing valve mechanisms are available to assure against loss of control of a governed hydraulic cylinder such as results when it no longer drives its load but is instead driven by the load. As is well known such valve mechanisms function to restrict exhaust flow from the cylinder at times when the load thereon tends to expel fluid from the cylinder faster than pressure fluid can be supplied to its expanding end from a pump. However, such counterbalancing and flow correlating valve devices were usually provided as an adjunct to the conventional directional control valve for the cylinder.

In contrast, it is the object of this invention to make use of the valve element of the directional control valve for a double acting cylinder or other reversibile fluid motor for counterbalancing and flow correlating purposes, so as to eliminate the need for special and costly adjunctive devices that were used for the same purpose heretofore.

More specifically, it is a purpose of this invention to provide for counterbalancing of the pressures at and correlation of the flow through the ports of a double acting hydraulic cylinder in a system comprising a control valve having a valve element to govern the direction of operation of the cylinder, a pilot valve to govern fluid pressure actuation of the main valve element, a pump having its outlet commonly connected with the inlets of the main and pilot valves, so that a load induced drop in pressure at the expanding end of the cylinder reduces the pilot applied fluid pressure relied upon to hold the main valve element in an operating position and allows the latter to be moved by the return bias thereon toward its hold position to a throttling position limiting the exhaust flow from the contracting end of the cylinder, and dash pot means for the main valve element, to control such return movement of the valve element to its throttling position.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

Figure 2:
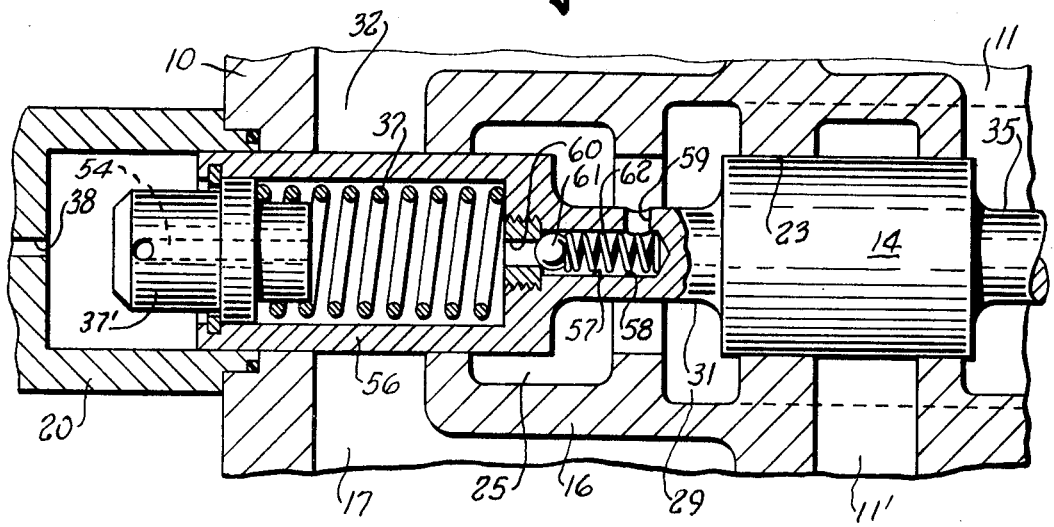
Figure 3:
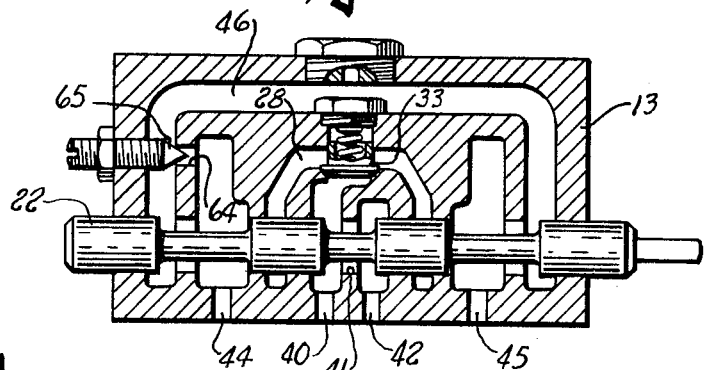
Figure 4:
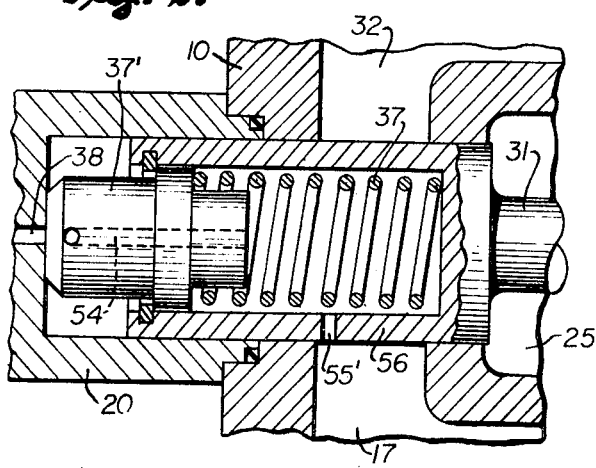

The drawings illustrate several complete examples of the physical embodiment of the invention constructed according to the best modes so far devised for the practical application of the principles thereof, and in which:

FIG. 1 is a more or less diagrammatic view illustrating how this invention can be embodied in a fluid pressure operated system comprising a double acting hydraulic cylinder and main and pilot control valve instrumentalities therefor;

FIG. 2 is a fragmentary view of a portion of the main valve, at an enlarged scale and in an operating position, illustrating a modification of the invention FIG. 3 is an enlarged fragmentary view of a portion of the pilot valve, showing another embodiment of the invention; and FIG. 4 is a fragmentary detail view similar to a portion of FIG. 1, but illustrating a slight modification of the valve therein seen.

Referring now to the accompanying drawings, the numeral 5 designates a reversible fluid motor, here shown as a double acting hydraulic cylinder having a piston 6 and a work performing element or rod 7 joined to the piston. The rod extends from one end of the cylinder for connection to the load to be driven by the cylinder. Ports 8 and 9 at the head and rod ends of the cylinder, respectively, provide for exhaust of pressure fluid from either end thereof in consequence of admittance of pressure fluid into its other end.

The operation of the cylinder is governed by valve instrumentalities like those shown and described in my copending application Ser. No. 707,267, filed Feb. 7, 1968, now patent 3,447,567. These instrumentalities include a main control valve 10 having an inlet 11 to receive pressure fluid from the outlet of a pump 12, and a pilot valve 13 to govern fluid pressure actuation of the valve element 14 of the main valve 10. The pilot valve also receives output fluid from the pump 12, and it further governs a combination bypass and speed controlling throttle valve mechanism 15.

The valve mechanism 15 can be incorporated in the body 16 of the main valve 10 in the manner fully described in my aforesaid copending application. The valve mechanism 15 serves as an unloading valve by which the pump 12 can be unloaded to an exhaust passage 17 in the body of the main valve at times when the main valve element 14 is in its neutral or hold position blocking fluid flow both into and out of the cylinder 5. Such unloading of the pump is necessary because of the fact that the main valve 10 does not have passages that provide for free flow of fluid entering its inlet 11 to the exhaust passage 17 thereof in the neutral or hold position of its valve element 14, for return to the reservoir 18.

The main valve element 14 is shifted hydraulically, by means of actuators 20 and 21 that are governed by the valve member 22 of the pilot valve. The hydraulic actuators are mounted on the body 16 of the main valve and comprise a pair of cylinders into which the opposite ends of the valve element 14 project to operate as pistons therein. The actuators are operable to effect actuation of the main valve element from its neutral or hold position shown, to each of a pair of operating positions at opposite sides of neutral.

The main valve element 14 is in the nature of a spool which is slidable axially back and forth in a bore 23 in the valve body, beneath and parallel to a shorter bore 24 containing the valve mechanism 15. The bore 23 is substantially medially intersected by the inlet passage 11, and the inner end of the shorter bore 24 opens directly to the inlet passage 11.

At locations spaced from and at axially opposite sides of the inlet passage 11, the bore 23 is joined by the inner ends of service passages 25 and 26. These passages open to the exterior of the valve body and are communicated with the motor ports 8 and 9 by ducts indicated at 25' and 26', respectively. Pressure fluid entering the inlet 11 of the main valve can be directed to one or the other of the service passages 25–26 by the main valve element, depending upon whether it is shifted to an operating position to the right or to the left of its hold position. In each of said operating positions of the valve spool 14, pressure fluid is transferred to the selected service passage through a U-shaped bridge passage like that designated 28 in the pilot valve 13. The legs 29 and 30 of the bridge passage open to the bore 23 at locations intermediate the inlet passage 11 and the service passages 25–26, to be communicable with the latter through circumferential grooves 31 and 31' in the control spool 14 in a more or less conventional manner. The same grooves provide for communicating either service passage with an adjacent branch 32 or 32' of the exhaust passage when the other service passage is in communication with the inlet passage 11 in the manner described. Fluid flowing to the bridge passage in the main valve 10 must open and pass a check valve such as indicated at 33 in the bridge 28 of the pilot valve.

The inlet passage 11 has a downstream branch 11' with which it communicates through a short central portion of the bore 23 and a central circumferential groove 35 in the control spool when the latter is in its neutral or hold position shown. While the downstream branch 11' can be dead ended, it is preferably restrictively communicated with the exhaust passage 17 through a substantially small diameter passage 36 that maintains sufficient pressure in the inlet 11 for operation of the actuators 20–21.

Centering or return springs 37 act upon the opposite end portions of the main valve element 14 to normally yieldingly hold it in its neutral or hold position. These end portions of the valve element extend across the opposite branches 32, 32' of the exhaust passage 17 and into the cylinders provided by the actuators 20–21, in which they are slidably received. The opposite ends of the valve element are hollow and provide wells to partially receive the centering springs 37 and the headed portions of plungers 37'. The plungers 37' are urged outwardly of the wells by the springs, into yielding engagement with the bottoms of the actuator cylinders to produce the desired centering action on the valve element. Passages 54 in the plungers communicate the wells with the actuator cylinders.

The valve member 22 of the pilot valve is operable to effect delivery of pressurized control fluid to either of a pair of pilot ports 38 and 39 for the actuators 20 and 21, respectively, and to simultaneously vent the other control port so as to cause the main valve element 14 to be shifted to one or the other of its operating positions described. The pilot valve member vents both control ports 38–39 in its neutral or hold position at which the centering springs 37 hold the main valve spool 14 in its neutral position.

The pilot valve 13 is similar in many respects to the main valve. Its inlet 40 is also supplied with pressure fluid from the pump 12; and its valve member 22 is also slidable axially in a bore in the body of the pilot valve from a neutral position shown to operating positions at opposite sides of neutral and corresponding to those of the main valve element. When the valve member 22 is in its neutral position, however, pump fluid entering the pilot inlet 40 can flow freely through an open center passage 41 to an outlet 42 for return to the reservoir 18 via a duct indicated at 43.

The pilot valve member 22 is operable to divert pressure fluid entering the inlet 40 to either of a pair of control ports 44–45 and to concurrently communicate the other control port with an exhaust passage 46. The control ports 44–45 are connected with the actuator pilot ports 38–39 in the hydraulic actuators, as by ducts indicated at 47 and 48, respectively.

Like the valve element 14 of the main valve, the pilot valve member 22 also closes off communication between the upstream and downstream portions of its inlet passage when it is moved out of neutral to either operating position. It is significant to note, however, that when the pilot valve member 22 is in neutral, it communicates both control ports 44 and 45 as well as the pilot inlet 40 with the reservoir. The control ports 44–45 are communicated with the reservoir through a duct indicated at 49, which connects with the exhaust passage 46 in the body of the pilot valve.

The combination unloading and throttling valve mechanism 15 which is like that disclosed in my Patent No. Re. 26,028, issued May 17, 1966, is governed by the pilot valve. It comprises a plunger-like fluid pressure responsive valve member 50 which controls flow of pressure fluid from the inlet passage 11 to the left hand branch 32 of the exhaust passage 17 through a bypass provided by the bore 24.

The valve element 50 is adapted to be opened by pressure of pump output fluid in the inlet passage 11 whenever the pilot valve member is in a neutral position at which it vents the hollow interior of the bypass valve member 50 through the open center passage in the pilot valve. The inlet 40 of the pilot valve is connected with the space in the interior of the valve member 50 for that purpose, as by a duct 52 and an axial passage 53 in the valve member. The passage 53 can extend entirely through the valve mechanism 15 to communicate with the inlet passage 11, in which case the inlet 40 of the pilot valve is supplied with pressure fluid from the pump 12, through the main valve inlet 11 and the interior of the bypass valve mechanism.

The bypass valve member 50 is caused to close in response to the back pressure produced at the inlet 40 of the pilot valve whenever its valve member 22 blocks the open center pilot passage in one or the other of the operating positions of the pilot valve member. Such back pressure is imposed on the valve member 50 to effect closure thereof in opposition to the opening force which fluid in the inlet passage 11 exerts on the valve member.

As brought out more fully in my aforesaid patent Re. 26,028, the bypass valve member 50 is caused to move toward its bypass closing position an extent proportional to the displacement of the pilot valve member out of its neutral position, so as to enable throttling of the operation of the cylinder 5 in various positions of the pilot valve member 22 between neutral and one or the other of its operating positions. It also serves as a void control valve, which is caused to open in consequence of force exerted on an external shoulder 51 by pressure fluid in the exhaust passage 17 at times when pump fluid cannot be fed into the expanding end of the cylinder fast enough and the load connected thereto causes pressure in the inlet passage to drop to a value below that of fluid in the exhaust passage 17.

According to this invention, the control spool 14 of the main valve is employed as a throttle valve to limit the exhaust of fluid from the contracting end of the cylinder 5 at times when the pressure in the expanding end of the cylinder drops and there is danger of the load driving the cylinder rather than being driven by it. Assuming, for example, that the pilot valve member has been actuated to its right hand operating position closing its through passage and directing pressurized control fluid to actuator 20 while venting the actuator 21. This will cause hydraulic actuation of main valve element 14 to the right to an operating position directing pump fluid to the head of cylinder 5 through its port 8, and at the same time venting cylinder port 9 to the right hand branch 32' of the exhaust passage through the adjacent groove 31' in the main valve element.

If at such a time, the load on the cylinder tends to extend the piston rod thereof at a rate such that the pressure in the expanding head end of the cylinder decreases and the load begins to drive the cylinder, the pressure in the inlet passage 11 and hence also at the pilot inlet 40 will drop accordingly. Any drop in pressure at the pilot inlet, of course, is manifested in a corresponding drop in pressure in the cylinder of valve actuator 20. Thus, when the fluid pressure force which actuator 20 exerts upon the control spool 14 drops to a value less than the return force exerted on the spool by the right hand centering spring 37, the control spool will begin to move toward its hold or neutral position provided that pressure fluid can escape from the actuator 20 to permit such return motion of the spool by the centering spring mechanism.

A restricted passageway 55 connecting with the cylinder of actuator 20 provides for such escape of pressure fluid therefrom. This passageway can be afforded by a clearance space around the exterior of the piston-like end portion 56 of the valve spool 14 in the cylinder of its actuator 20, which clearance space opens inwardly to the adjacent branch 32 of the exhaust passage 17. Consequently, fluid in the cylinder of actuator 20 can be expelled therefrom to the left hand branch 32 of the exhaust passage 17, to which said passageway 55 opens, to allow the control spool to be moved to a return flow throttling position at which it restricts communication of the right hand groove 31' of the control spool with the adjacent branch 32' of the exhaust passage, to thus limit the flow of exhaust fluid from port 9 of the cylinder to the exhaust passage 17. The extent to which the main valve spool is moved toward its hold position will, of course, be proportional to the drop in pressure at the outlet of the pump 12, and hence to the drop in pressure in the actuator 20. As a result, the main valve spool will seek a position at which it throttles return flow from the rod end of the cylinder 5 through groove 31' sufficiently for fluid to be maintained at a positive control value in the head end of the cylinder.

If the load connected to the cylinder 5 tends to drive the cylinder in both directions, as a load swinging about a vertical axis might, the clearance defining passageway 55 can be duplicated at both ends of the main valve element, as shown. Hence, throttling of the fluid exhausting from either end of the cylinder 5 is possible, along with positive control over said cylinder at all times.

If desired, a small orifice in 55' in cylindrical wall of each end portion 56 of the main valve spool can be provided as shown in FIG. 4 to permit escape of fluid from either actuator 20-21 to its adjacent exhaust branch 32 or 32' as obvious substitutes for the clearance spaces 55.

The purpose of restricting the escape of fluid from the actuators 20-21 is to provide a dash pot for the main valve spool by which its throttling return motion is slowed and controlled to the extent that overtravel and objectionable hunting of the spool resulting from such overtravel is precluded. If fluid were unrestrictedly free to escape from the actuators 20-21 at the critical time in question, it can be seen that the return bias on the valve spool would propel it rapidly toward, and at times to, its hold position at which it completely blocks the flow of return fluid to the exhaust passage from the contracting end of the cylinder. The pressure at the pump outlet would immediately build up, of course, and the spool would again be moved by its actuator toward its operating position, only to be returned toward hold if it allowed too much fluid to exhaust from the contracting end of the cylinder.

Aside from the hunting action described above, there is also a possibility that sudden return of the valve spool toward its hold position could produce such high shock pressures as to result in damage to the hydraulic system.

It will be apparent that there are other equally effective ways of providing a dash pot action for the main valve spool. One obvious way, for example, would be to make the actuator ports 38 and 39 small enough so that either could serve as a restricted outlet from the actuator, through which fluid would have to be expelled during throttling return movement of the main valve spool under the influence of the centering spring mechanism thereon.

At any rate, it is not only of the essence of the invention to assure positive control over the hydraulic cylinder 5 through the described automatic metering action of the main valve spool 14, but it is just as important to assure stability of the main valve spool at all times. The dash pot action described prevents hunting of the valve spool and assures that stability.

In this respect, however, it should be borne in mind that in order to assure the desired stability of the main valve spool, there could be times that the throttling return motion of the spool might not be rapid enough to prevent a void from being drawn in the expanding end of the cylinder 5. According to this invention, however, the unloading and throttling valve mechanism 15 cooperates with the main valve spool to prevent voids from being drawn in the expanding end of cylinder 5 in the event the dash pot effect on the throttling return motion of the valve spool fails to restrict exhaust flow from the contracting end of the cylinder quickly enough. It does so by reason of the fact that the valve member 50 in mechanism 15 will be opened by pressure of exhaust fluid on its external shoulder 51 at times when the pressure of fluid in the expanding end of the cylinder 5 and hence at the inlet 11 drop to a value below that of fluid in exhaust passage 17. Such opening response of the valve member 50 to pressure in the exhaust passage 17 can be enhanced by restricting the outlet 34 of the main valve in a manner now well known in the art.

FIG. 2 shows how the centering spring mechanism acting upon the main valve spool can effect expulsion of fluid from the actuator 20, for example, to the adjacent service passage 25 for flow to the motor port 8 at times when the load on cylinder 5 creates a drop in the pressure of fluid being supplied to its head end. As seen in FIG. 2, such low pressure fluid in the actuator 20 can flow to the motor port 8 through a restricted passageway 57 in the main spool 14 itself. The passageway 57 comprises an axial well 58 in the spool having one end opening through a radial bore 59 to the exterior of the neck defined by the bottom of the left hand groove 31 in the spool, and having its other end opening to the interior of the adjacent hollow end portion 56 of the spool through an orifice 60. A ball check valve 61 in the well 58 is urged by a spring 62 toward the seat provided by the orifice 60 to normally close the restricted passageway 57. The ball 61, however, is movable off of its seat in consequence of return movement of the spool under the influence of return bias thereon to let low pressure fluid from the actuator 20 flow through its seat to the left hand groove 31, and to the motor port 8 when the latter is communicated with the pump 12 through said groove.

In this case also, the restricted passageway 57 can be provided in each end portion of the main valve spool in the event the load on the cylinder is such as to tend to drive the cylinder in both directions; and each orifice 60 and its ball check 61 serve as a dash pot to damp the movement of the main valve element 14 under the influence of return bias thereon.

FIG. 3 illustrates another embodiment of the invention wherein return bias on the main valve spool when the latter is in its right hand operating position, and at a time when the load on cylinder 5 creates a pressure drop in its head end, causes fluid in actuator 20 to be expelled to the reservoir through an escape passageway comprising the control line 47, pilot control port 44, an orifice 64 providing the necessary dash pot restriction in the pilot valve, and the exhaust passage 46 of the latter. If desired, the orifice 64 can be made large enough so that its effective area can be adjusted by a needle valve 65.

An obvious equivalent of this last described expedient would be to provide the pilot check valve 33 with an orifice so that fluid expelled from actuator 20 could flow restrictedly through the bridge passage 28 in the pilot valve to its inlet 40 and back to the main valve inlet 11 via duct 52 and the passage 53 in the unloading valve mechanism 15.

In each of the embodiments of the invention described above, restricted escape passageways can be provided for one, or both actuators 20–21, to create a dash pot effect on the main valve spool as it is shifted out of an operating position to a counter-balancing or flow correlating position throttling flow of return fluid from cylinder 5 to the reservoir. The restriction to flow of low pressure fluid out of the actuator is important, regardless of the path along which such expelled fluid travels, in that the dash pot action on the main valve element achieved thereby prevents such rapid cut-off of return fluid from the cylinder as might result in the creation of high shock pressures, and also serves to assure stability of the main valve element by preventing hunting thereof as it performs its throttling function.

From the foregoing description together with the accompanying drawings, it will be readily apparent to those skilled in the art that this invention provides a novel and exceptionally simple means for effecting correlation of flow through the ports of a reversible fluid motor and counter-balancing of pressures at said ports to assure positive control over the motor despite tendencies for the motor to be driven by the load to which it is connected.

What is claimed as my invention is:

1. Fluid flow control means for a reversible fluid motor, wherein pilot valve means effects shifting of a main valve element against return biasing means from a hold position to a working position at which pressure fluid from a source thereof entering the inlet of the main valve can flow through a service passage therein to one port of the motor and fluid expelled from the other port of the motor can flow to a return line through return passage means in the main valve that can be restricted to a degree determined by the extent the main valve element is returned toward its hold position, said fluid flow control means being further characterized by:

(A) an actuator activatable by fluid under pressure to shift the main valve element to said working position thereof;
(B) means controlled by the pilot valve means for activating the actuator by pressure fluid from said source so that a drop in pressure at said one motor port will similarly result in a drop in pressure to which the actuator is subjected when the main valve element is in said working position thereof;
(C) means providing a passageway through which the actuator can be relieved of fluid pressure so as to permit said biasing means to impart return motion to the main valve element in consequence of load induced reduction in pressure at said one port;
(D) and dash pot means by which said return motion of the main valve element is damped.

2. The control means of claim 1, further characterized by:

(A) said passageway being restricted to provide said dash pot means and being located in the main valve element to provide a flow path leading from said actuator to said service passage in said working position of the main valve element;
(B) and a check valve normally closing said restricted passageway and arranged to open when pressure in said actuator exceeds the pressure in said service passage.

3. The fluid flow control means of claim 1 further characterized by:

(A) said passageway connecting with the reservoir;
(B) and said dash pot means comprising restriction means in said passageway.

4. The control means of claim 2, wherein said restricted passageway is located in the main valve and leads to said service passage thereof from the actuator.

5. The control means of claim 2, wherein said restricted passageway is located in the main valve and leads to an exhaust passage therein from an operating chamber associated with the actuator.

6. The control means of claim 5, wherein one end portion of the main valve element extends across said exhaust passage in the main valve and into said chamber; and a slight clearance space between the valve element and the wall of the chamber communicates the latter with said passage and provides said restricted passageway.

7. The control means of claim 3, wherein said restricted passageway comprises a port in the pilot valve means.

8. The control valve of claim 7, further characterized by an adjustable needle valve to regulate the size of the orifice provided by said port.

9. Control means for a reversible fluid motor, comprising the combination of:

(A) a main valve having an inlet, an exhaust outlet, a pair of service passages for connection with the ports of a reversible fluid motor, and a valve element movable from a hold position to an operating position to connect its inlet with one service passage and to connect its other service passage with the exhaust outlet across a return flow controlling portion of the valve element;
(B) a fluid pressure operated actuator for the main valve element having a chamber to which pressure fluid can be admitted to effect actuation of the main valve element to said operating position thereof;
(C) a pilot valve having an inlet, exhaust outlet means, a control port connected with said chamber, and a valve member which in one operating position directs pressure fluid entering its inlet to said control port thereof for flow to said chamber;
(D) means communicating the inlets of the main and pilot valves with one another so that a load induced drop in pressure in said one service passage when the latter is communicated with the main valve inlet will be manifested in corresponding drop in pressure at the pilot inlet and in said pressure chamber;
(E) means defining a restricted passageway connecting with said chamber and through which pressure fluid therein can escape to permit the main valve element to move toward its hold position from said operating position thereof, relative to the pilot valve member;
(F) and return spring means acting upon the main valve element with a force sufficient to effect such movement thereof toward its hold position in consequence of said load induced drop in pressure in the actuator chamber, so as to thereby render said return flow controlling portion of the main valve element effective to restrict return flow from the motor to the exhaust outlet.

10. The control means of claim 9, wherein said restricted passageway is defined in part by the connection between said chamber and the pilot control port, and in part by passages in the pilot valve which communicate said control port with the pilot outlet in said one operating position of the pilot valve member.

11. Control means for a reversible fluid motor wherein a pump is provided to supply pressure fluid to the inlet of a control valve for flow to one port of the motor through a connecting first service passage in the valve in one position of its valve element at which fluid exhausting from the other motor port is returned to a second service passage of the valve for flow to an exhaust passage across a portion of the valve element capable of restricting such return flow in positions of the valve element intermediate said one position and a hold position of the element, said control means being further characterized by:

(A) an actuator for the valve element having a chamber with an inlet to which pressure fluid can be supplied to effect movement of the valve element from its hold position to said one position thereof;

(B) means for so communicating the outlet of the pump with the inlet of the pressure chamber and the inlet of the control valve that a load induced low pressure condition at said one motor port will be manifested in a similar low pressure condition at the outlet of the pump and in said chamber as soon as the valve element is moved toward said one position thereof by its actuator;

(C) spring means acting upon the valve element to yielding oppose actuator produced motion thereof toward said one position thereof and by which actuator produced motion of the valve element beyond one of said intermediate return flow restricting positions is prevented so long as said load induced low pressure condition obtains at said one motor port;

(D) and means providing a restricted passageway at all times communicating with said chamber and through which pressure fluid therein can escape to permit return movement of the valve element toward its hold position under the influence of said spring means.

12. Control means for a reversible fluid motor wherein the outlet of a pump is connected with the inlet of a directional control valve having a valve element which, in a first position thereof, directs pump output fluid to one port of the motor through a first service passageway in the valve and concurrently directs exhaust fluid returning to a second service passage in the valve from the other port of the motor to an exhaust passage across a portion of the valve element capable of restricting such return flow in positions of the valve element intermediate said first position and a second position thereof at which said return flow is blocked by the valve element, said control means being further characterized by:

(A) actuator means for said valve element having a chamber with an inlet to which pressure fluid can be admitted to effect movement of the valve element toward said first position thereof;

(B) means to communicate the inlet of the chamber with the outlet of said pump, so that when the valve element has been moved to its said first position by the actuator means therefor, the pressures at the pump outlet and the inlet of said chamber will be substantially the same as the pressure in said first service passage;

(C) and means operable in response to a load induced low pressure condition in said first service passage for moving the valve element toward said second positions thereof to one of said intermediate positions and for holding the valve element in said latter position for as long as said load induced low pressure condition obtains, said last named means comprising a restricted passageway at all times in communication with said chamber and through which fluid can escape from said chamber.

13. Control means for a reversible fluid motor comprising the combination of:

(A) a main valve having an inlet to receive pressure fluid from a pump, outlet means, a pair of service passages for connection with a reversible fluid motor, and a valve element movable from a hold position to each of a pair of operating positions to connect either service passage with the inlet and the other with the outlet means;

(B) a pilot valve having an inlet at all times connected with that of the main valve, outlet means, a pair of control ports and a valve member movable from a neutral position to each of a pair of operating positions to connect either control port with its inlet and the other control port with the outlet means;

(C) fluid pressure operated actuator means for the main valve element having a pair of pilot ports respectively connected with said pilot control ports, for shifting the main valve element to one or the other of its operating positions depending upon which pilot port is being supplied with pressure fluid while the other control port is vented;

(D) and means operable in consequence of drop in pressure at the main valve inlet in either of said operating positions of the pilot valve member for effecting return movement of the main valve element relative thereto out of its corresponding operating position to a position intermediate the latter and hold, and at which intermediate position the main valve element restricts communication between said outlet and the service passage then communicated therewith, said last named means comprising restricted passage means connected with said actuator means, through which fluid must flow in order to permit return movement of the valve element to said intermediate position, and by which said return movement of the main valve element is damped.

References Cited

UNITED STATES PATENTS

Re. 26,028     5/1966     Tennis _____ 137—596.13 XR

HENRY T. KLINKSIEK, Primary Examiner

U.S. Cl. X.R.

137—596.15, 625.63; 251—285